US011878744B2

(12) United States Patent
Lehmkuhl

(10) Patent No.: US 11,878,744 B2
(45) Date of Patent: Jan. 23, 2024

(54) STEERING GEAR FOR A STEER-BY-WIRE STEERING DEVICE OF A MOTOR VEHICLE

(71) Applicant: ZF Friedrichshafen AG, Friedrichshafen (DE)

(72) Inventor: Stefan Lehmkuhl, Bad Rothenfelde (DE)

(73) Assignee: ZF Frie drichshafen AG, Friedrichshafen (DE)

( * ) Notice: Subject to any disclaimer, the term of this patent is extended or adjusted under 35 U.S.C. 154(b) by 574 days.

(21) Appl. No.: 17/088,843

(22) Filed: Nov. 4, 2020

(65) Prior Publication Data

US 2021/0155281 A1 May 27, 2021

(30) Foreign Application Priority Data

Nov. 21, 2019 (DE) ..................... 10 2019 217 965.7

(51) Int. Cl.
*B62D 5/00* (2006.01)
*B62D 5/04* (2006.01)
*B62D 3/06* (2006.01)

(52) U.S. Cl.
CPC ............... *B62D 5/001* (2013.01); *B62D 3/06* (2013.01); *B62D 5/04* (2013.01)

(58) Field of Classification Search
CPC ............. B62D 5/001; B62D 3/06; B62D 5/04
See application file for complete search history.

(56) References Cited

U.S. PATENT DOCUMENTS 11,008,036 B2 * 5/2021 Klank ...................... B62D 3/06
2003/0150667 A1 * 8/2003 Boyle .................... B62D 7/148 180/444

FOREIGN PATENT DOCUMENTS

DE 102009054671 A1 * 6/2011 ......... B60G 21/0556
DE 102011055734 A1 * 5/2013 ............... B62D 5/04
DE 102011085556 A1 * 5/2013 ............. B60G 7/008
DE 102011085556 A1 5/2013
WO 2013/075960 A2 5/2013

OTHER PUBLICATIONS

German Office Action issued in corresponding German Patent Application No. 10 2019 217 965.7 dated Jul. 6, 2020.

* cited by examiner

*Primary Examiner* — Jacob D Knutson
(74) *Attorney, Agent, or Firm* — Finch & Maloney PLLC

(57) ABSTRACT

A steering gear system (20) for a steer-by-wire steering device of a motor vehicle. The steering gear system having a housing (22), a spindle (24) and a rotatably mounted spindle nut (5), which is located within the housing (22), and a spindle drive (23) for the axial displacement of the spindle (24) relative to the spindle nut (25). The steering gear system further having a spindle nut (25) which, by way of at least one energy store (40), is supported at least indirectly relative to the housing (22) in the rotational direction about a longitudinal axis (a) of the spindle nut (25), so that the spindle nut (25) can be kept in a zero position or in a range around the zero position and/or turned back to the zero position.

11 Claims, 3 Drawing Sheets

STEERING GEAR FOR A STEER-BY-WIRE STEERING DEVICE OF A MOTOR VEHICLE

This application claims priority from German patent application serial no. 10 2019 217 965.7 filed Nov. 21, 2019.

FIELD OF THE INVENTION

The invention relates to a steering gear system for a steer-by-wire steering device of a motor vehicle, and a steer-by-wire steering device of a motor.

BACKGROUND OF THE INVENTION

From WO 2013/075960 A2 an electro-mechanical vehicle steering system is known. The vehicle steering system comprises a steering gear system of non-self-locking design, which by means of a positionally fixed spindle nut can move a spindle relative to the housing. The steering gear system is part of a so-termed servomotor, which exclusively provides force support for a rack-bar steering system. If the steering support fails, an axially acting spiral spring is provided which enables the spindle to be returned to a preselected position. Thus a steering gear system is disclosed, which in a servo-steering system ensures repositioning of the wheels in the event of a fault.

The purely axially acting restoring spring according to the aforesaid prior art can only be used with non-self-locking spindle drives. Thus, the purpose of the present invention is to indicate a steering gear system for a steer-by-wire steering device, which enables repositioning even with a self-locking spindle drive.

SUMMARY OF THE INVENTION

The invention includes the characteristics specified in the independent claims. Advantageous design features emerge from the subordinate claims.

According to a first aspect, the invention relates to a steering gear system for a steer-by-wire steering device of a motor vehicle, which comprises a housing, a spindle and a spindle nut mounted so that it can rotate. In particular, the spindle nut is positionally fixed relative to the housing. The spindle nut has an internal thread, which engages with the external thread of the spindle. Thus, the threads of the spindle and the spindle nut form a movement thread, preferably in the form of a self-locking trapezium thread. The spindle nut and the spindle are arranged inside the housing, where they form a spindle drive for moving the spindle axially relative to the spindle nut when the spindle nut is driven in rotation. Likewise, the movement of the spindle relative to the housing takes place when the spindle nut is mounted positionally fixed inside the housing. The drive input is preferably provided by an electric motor, which drives the spindle nut directly or indirectly and preferably by way of a traction drive. In the latter case the traction drive consists of a drive belt which grips a belt pulley on the electric motor and a belt pulley on the spindle nut in a rotationally fixed manner. The two belt pulleys are preferably made with teeth, so that a drive belt preferably in the form of a ribbed belt ensures a drive system free from slip. This enables highly precise axial displacement of the spindle.

In the event that the drive fails, for example if the electric motor develops a fault or there is an electrical and/or signal supply failure or if the drive belt tears, the steer-by-wire steering device remains in its position at the time, which is equivalent to a standstill of the steering gear system and thus, as it were, to freezing of the steering movement. In other words, the currently set wheel steering angle at the wheel concerned, or the wheels of the steerable axle concerned, remain fixed. For a vehicle this means that driving round a curve would be continued even if the trajectory of the vehicle requires driving to continue in a straight direction, for example when in a self-driving vehicle the trajectory is calculated in advance. It is therefore important that in the event of a fault the steer-by-wire steering device has a quasi-autonomous ability to set a neutral steering angle so that the wheels can be orientated parallel to the longitudinal direction of the vehicle. That corresponds to a target steering angle of zero degrees.

According to the invention, the spindle nut is supported by means of at least one energy store at least indirectly relative to the housing in the rotational direction about its longitudinal axis. Thus, the spindle nut can be kept within a range around the zero position or in the zero position. In addition or alternatively, the steering gear system can be designed in such manner that the spindle nut can be rotated back to the zero position. If the vehicle is already driving in the longitudinal direction, i.e. with a nominal steering angle of zero degrees, then by virtue of the energy store the spindle nut can be kept in the zero position or within a range around the zero position. That steering angle is also called the neutral steering angle. As a result, in the case of a steer-by-wire steering device with no drive a spontaneous displacement of the wheels caused by dynamic effects in the chassis, such as impacts due to bumps in the road, is prevented since the spindle nut is held in the zero position. There is no need for anything such as an electro-mechanical lock to maintain a neutral steering angle. The exact zero position of the spindle nut corresponds to a nominal steering angle of zero degrees, so that in the straight-ahead driving direction the wheels are orientated parallel to the length of the vehicle. Depending on the vehicle or its chassis, it can also be sufficient for the wheels to be restored to a wheel steering angle of approximately zero degrees. If the spindle nut is kept within a range around the zero position, that condition can be reached with the steering gear system.

Furthermore, with the invention, drifting of the spindle in the direction of its end-stops is not possible, or only so to a limited extent. Moreover, depending on the driving situation a wrong position that is unforeseen, such as a position error at the rear axle with the rear wheels moved in the same direction as the front wheels, which corresponds to the so-termed “dachshund walk”, can be prevented if this is not desired in accordance with the driving situation. In the case of a fault in a so-termed central actuator, a steer-by-wire steering device which is arranged in a fixed position on the vehicle and can steer two wheels of an axle simultaneously, this can be used to good advantage. However, the invention can also be used with so-termed individual actuators. With individual actuators an individual steer-by-wire steering device is used for each wheel to be able to adjust the wheel steering angle of that wheel. Owing to the aforesaid fault, in the case of individual actuators it is possible that if there is a fault the two individual actuators produce an unfavorable toe-in or toe-out at the rear axle, which is difficult for an at least inexperienced driver to master. By returning the spindle nut to the zero position or at least to a position within a range around it, the wheels are returned to a wheel steering angle close to or exactly equal to zero degrees so that the fault can be mastered by the driver, since that corresponds approximately or exactly to driving straight ahead.

In a preferred embodiment the energy store is in the form of a spring, in particular a spiral spring or a torsion spring or a leg spring or a volute spring. Such springs can be produced inexpensively and do not add any substantial extra weight to the steering drive or the steer-by-wire steering device.

The energy store is preferably arranged coaxially around the spindle and/or coaxially with the spindle nut. In a preferred embodiment the spring surrounds the spindle and/or the spindle nut. Best of all, the spring surrounds or in other words embraces the spindle and is embraced at least by part of the spindle nut or alternatively surrounds part of the spindle nut. This results in a space-saving arrangement so that the restoring mechanism can be integrated with little constructive effort into existing steering gear systems of steer-by-wire steering devices.

In order to be able to keep the spindle nut in the zero position or within a range around it, the energy store is coupled at least indirectly to the spindle nut at a first end. In addition or alternatively, the energy store is attached to a drive wheel coupled to the spindle nut with interlock and/or frictionally and/or in a materially-merged manner. At a second end the energy store is attached at least indirectly to the housing or the spindle of the steer-by-wire steering device or of the steering gear system. The first and/or second end of the energy store can be attached to the components, for example, by means of a rivet. Alternatively, they can be screwed or welded on. Alternatively the respective ends of the energy store can be fixed in an articulated manner so that if the spindle nut rotates, the first and/or second end of the energy store can move relative to the component to which it is attached.

In a further preferred embodiment the energy store is designed so that its restoring torque is smaller than the torque of the drive of the steering gear system of the steer-by-wire steering device. As already mentioned, the drive is preferably in the form of an electric motor or an electric motor with a transmission. The transmission is preferably in the form of a belt drive. Alternatively, the transmission can be in the form of a gearwheel transmission.

Preferably, with a self-locking spindle drive the restoring torque of the energy store is larger than the overall torque brought about by the self-locking. The self-locking in the case of a spindle drive is obtained on the one hand due to the thread pitch, which is sufficiently small that with a force acting on the spindle approximately parallel to its longitudinal axis, the spindle nut does not rotate. This, for example, is the case with standardized trapezium threads, which are usually used in rear axle steering systems. Furthermore the self-locking results from the maximum friction torque produced due to the surface pressure of the thread flanks in the movement thread. Since in this case the purpose of the steering gear is to change the wheel steering angle of the respective wheels of an axle, the maximum transverse forces that occur due to the lateral forces in the chassis have to be taken into account. Namely, these additionally increase the surface pressures in the movement thread when the lateral forces acting on the wheels also act indirectly or directly on the spindle. In addition further tribological influences due to the lubricant used, particularly at low temperatures, must be taken into account. At low temperatures the viscosity can be assumed to be higher, which can also increase the overall torque. Furthermore it should be borne in mind that the overall torque for actuating the spindle nut, and thus overcoming the self-locking effect in the steering drive, changes due to dynamically acting forces. Dynamic lateral forces, i.e. forces that are not constant but of varying size and sign, caused by bumpiness of the road, can be transmitted into the chassis via the wheels to be steered. This helps already small spring forces to suffice for rotating the spindle nut back in the appropriate direction for moving the spindle, as when a maximum static lateral force acts on the spindle. The aspects are taken into account when designing the spring and its dimensions.

According to a further aspect, the invention relates to a steer-by-wire steering device for a motor vehicle, preferably a rear axle steering system, which is formed with a steering gear system as explained above. A steer-by-wire steering device is not, for example, a steering force assistance as indicated above for the prior art. A steer-by-wire steering device is a device with which the adjustment movement for changing the wheel steering angle takes place by virtue of an electric adjustment signal from a control unit. The steer-by-wire steering device is supported on the chassis or the body or vehicle body. The steer-by-wire steering device is actuated and operated purely electrically. There is no mechanical connection between the steering wheel and the steer-by-wire steering system. Thus, by virtue of an electrical connection between the control unit and the steer-by-wire steering device interventions in the driving dynamics can be carried out very simply, particularly when in addition to the steered front axle the rear axle too is designed to be steerable, in that a steer-by-wire steering device produces the steering movements there as well. A vehicle with a steerable rear axle makes the vehicle more agile. At low driving speeds, for example less than 50 km/h, the use of rear axle steering allows the turning circle to be made smaller. For that, the rear wheels are steered in the opposite direction to the steering movement of the front wheels. At higher speeds, moreover, an avoidance measure or even an overtaking process can be carried out with greater driving stability. In the latter case at the rear axle the steering is carried out in the same direction as the front wheels. For computing the adjustment signal for the steer-by-wire steering device, a control unit takes into account parameters such as the steering angle at the front wheels, the vehicle speed, the vehicle's acceleration and the yaw rate of the vehicle, etc. In the event of a fault, a control unit can cut off the electric motor drive so that the spring can turn the spindle nut back more easily, since no motor torque then has to be overcome.

BRIEF DESCRIPTION OF THE DRAWINGS

Example embodiments of the invention are shown in the drawing and will be described in greater detail below, so that from the description and/or the drawing further features and/or advantages may emerge. The drawing shows.

DETAILED DESCRIPTION OF THE PREFERRED EMBODIMENTS

Figure 1:
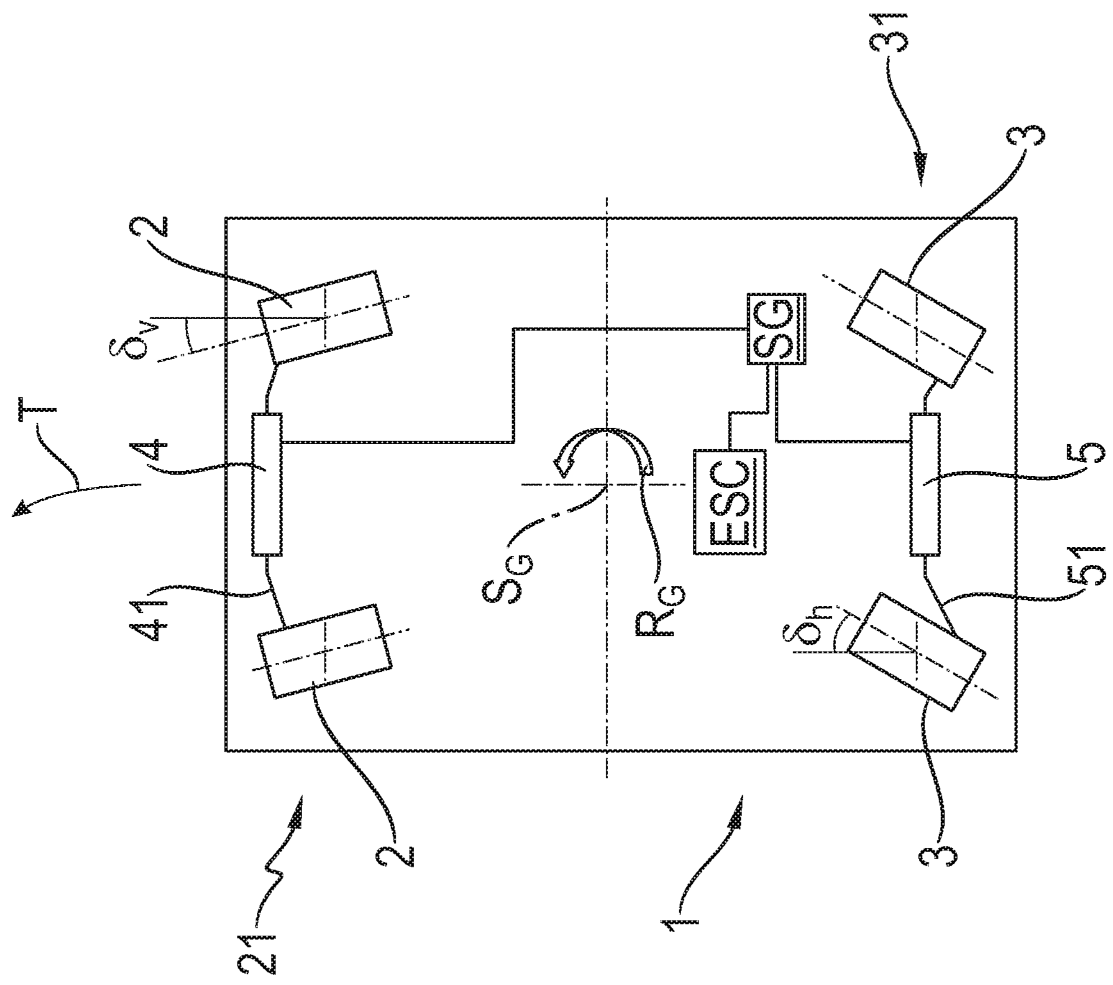
FIG. 1: A schematic view of a motor vehicle with a steer-by-wire steering device for the front axle and a steer-by-wire device for the rear axle.

FIG. 1 shows schematically a vehicle 1 with a steerable front axle 21 and a steerable rear axle 31. To steer the wheels 2 on the front axle 21 a central steer-by-wire steering device 4, i.e. one that acts simultaneously on both wheels, also known an a central actuator, is provided, which by way of a steering linkage 41 can adjust or change the wheel steering angle $\delta_V$ of the front wheels 2. That angle $\delta_V$ is indicated as an example on the right-hand wheel 2 in FIG. 1. Likewise, by way of a steering linkage 51 of the rear axle 31 a central steer-by-wire steering device 5 can adjust or change the wheel steering angle $\delta_H$ of the rear wheels 3. In the embodiment illustrated the front axle steering 4 and the rear axle steering 5 are electrically connected or coupled to one another via a control unit SG. A yaw rate $R_G$ measured at the center of gravity $S_G$ is determined by a suitable sensor (rotational rate sensor) at the center of gravity of the vehicle 1 and detected and evaluated by an electronic stability control ESC. In addition, from further sensors (not shown) at least the speed and acceleration of the vehicle and a steering angle input from the driver and the wheel steering angles of the wheels 2, 3 are sent to the control unit SG. The vehicle follows a trajectory T which in FIG. 1 is represented schematically at the front of the vehicle in its travel direction and in this case corresponds to a curve to the left. As a function of the parameters, the control unit calculates a steering angle for keeping to the trajectory and controls the steering devices 4, 5 appropriately. This is done exclusively by means of electrical signals ("by-wire").

Figure 2:
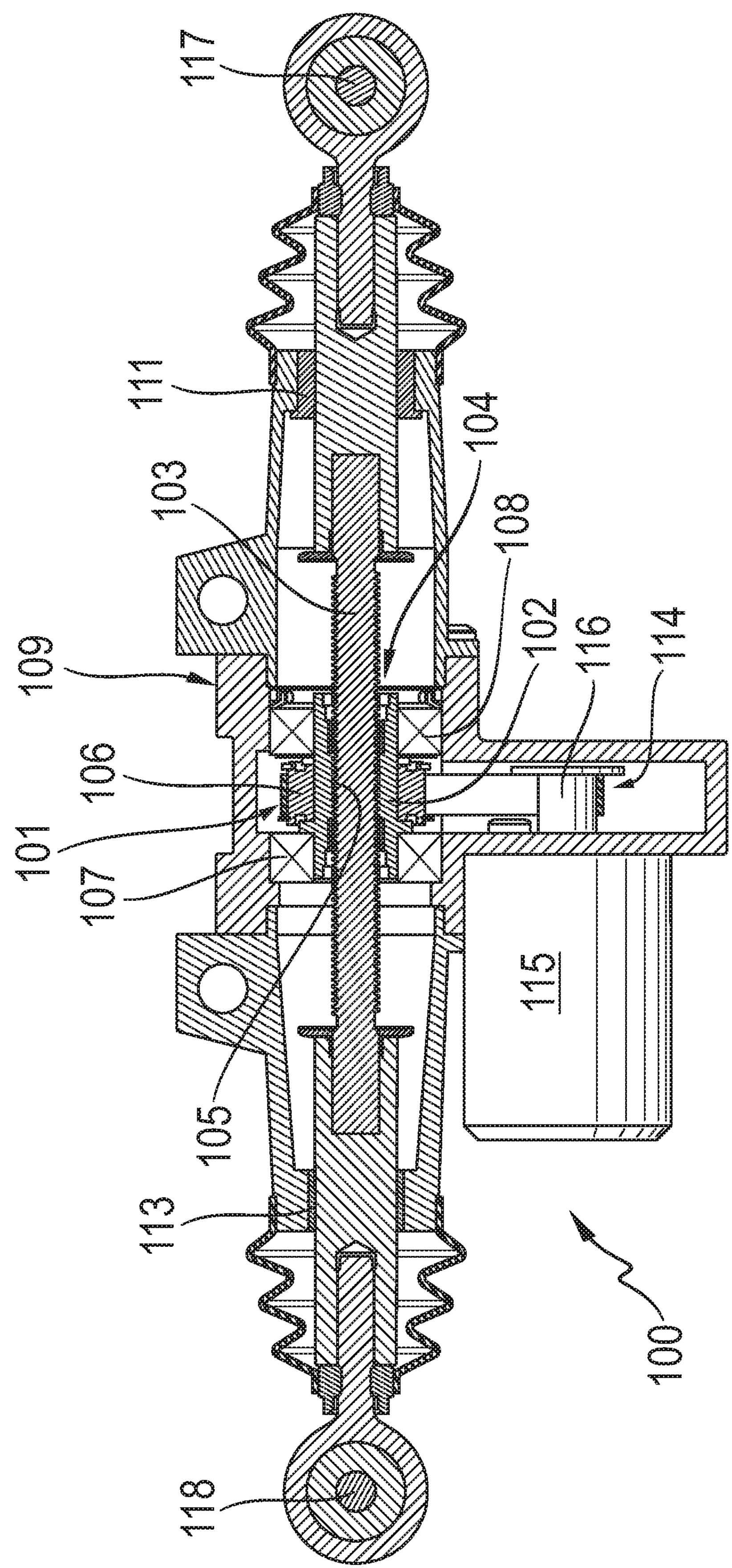
FIG. 2: A steer-by-wire steering device for a motor vehicle.

FIG. 2 shows a steer-by-wire device in the form of a central actuator 100 according to the prior art, which can be used as a steer-by-wire device 4, 5 in the vehicle 1 according to FIG. 1. The central actuator 100 comprises a housing 109 fixed to the vehicle, in which a spindle 103 is mounted by means of slide bearings 111, 113. The spindle 103 has an external thread which engages with the internal thread 105 of the spindle nut 102, forming a movement thread of a spindle drive 104. On the spindle nut 102 is arranged a belt pulley 106 of a traction drive 114. The spindle nut 102 is supported relative to the housing 109 by a pair of fixed oblique ball-bearings 107, 108, so that the spindle nut 102 is mounted positionally fixed relative to the housing 109. The traction drive 114, which besides the belt pulley 106 comprises a drive wheel in the form of a belt pulley 116, is driven by an electric motor 115 arranged with its axis parallel to the spindle 103. The spindle 103 of the central actuator 100 is at each of its ends connected to pivot bushings 117, 118 arranged outside the housing 109, which bushings for their part are connected to track rods (not shown here) for the respective rear wheels 5. Thus, the central actuator 100 works when the spindle 103 moves axially, by acting simultaneously on the rear wheels to change the wheel steering angle by rotating about the vertical axis of the wheels.

Figure 3:
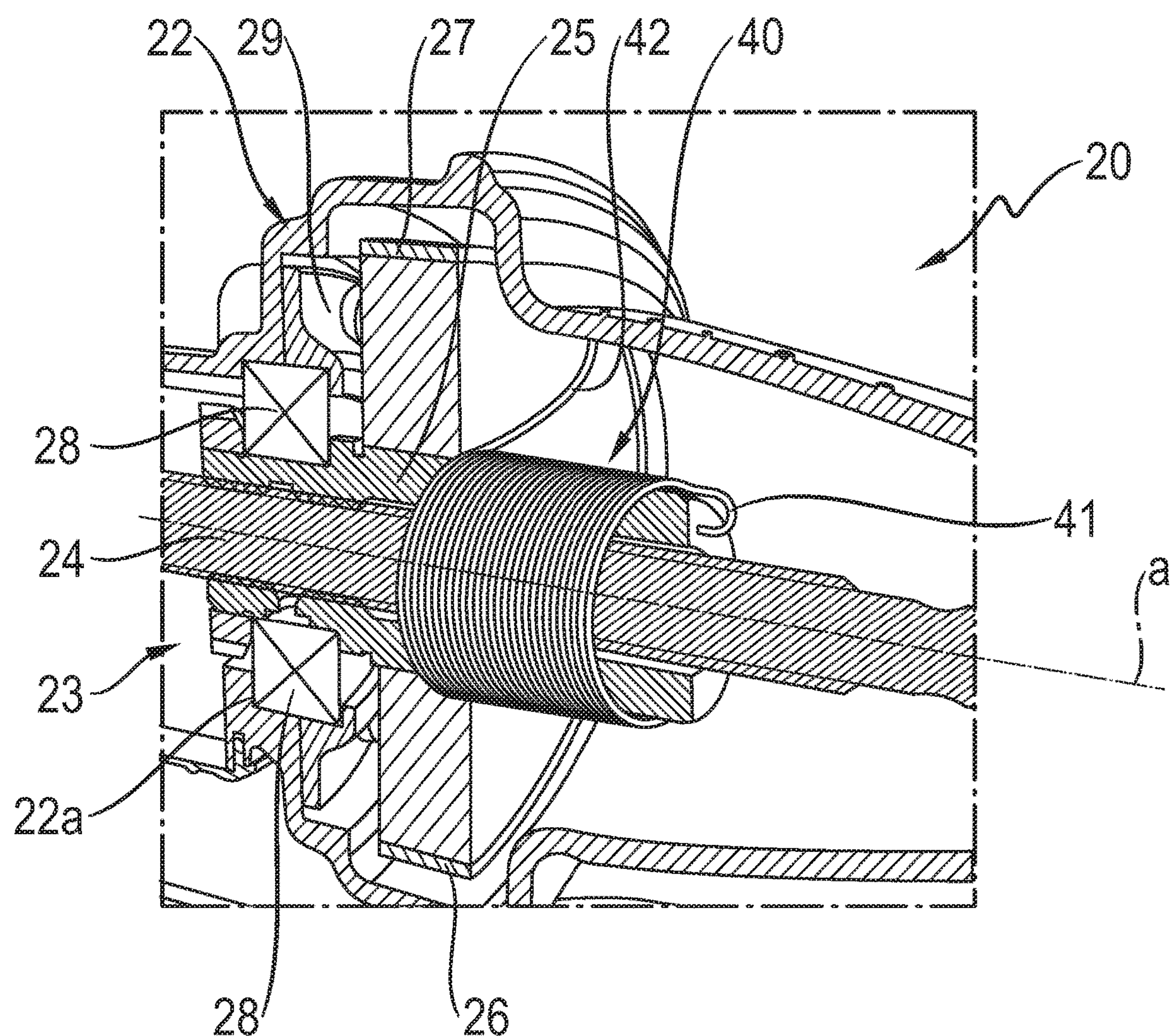
FIG. 3: A perspective partial view of a steering gear system according to the invention.

FIG. 3 shows a perspective representation of a partially sectioned steering gear system 20, which can be used in a steer-by-wire steering device 4, 5 according to FIG. 1. FIG. 3 also shows a spindle drive 23 comprising a spindle 24 and a spindle nut 25 which are engaged with one another. The spindle nut 25 surrounds a belt pulley 27 and is driven in rotation by traction means 26 in the form of a belt. The spindle nut 25 is mounted relative to the housing 22 by a roller bearing 28. By rotating the spindle nut 25, the spindle 24, which is secured against rotation, is moved axially relative to the spindle nut 25 and the housing 22. The movement thread is in the form of a self-locking trapezium thread so that without drive power no displacement of the spindle drive 23 takes place. The housing 22 is preferably a light-metal pressure diecasting made of a magnesium or aluminum alloy. Coaxially with the longitudinal axis a of the spindle 24, an annular cover 29 is arranged which fixes the roller bearing 28 axially with its outer ring relative to the housing 22, so that the spindle nut 25 is mounted positionally fixed but rotatable relative to the housing 22. On the side facing away from the belt pulley 27, the spindle nut 25 is encompassed by an energy store in the form of a spring 40. In the zero position illustrated here, the spring 40 surrounds the spindle nut 25 coaxially. In other words, in the zero position the spring 40 is arranged concentrically around the longitudinal axis a and coaxially around the spindle nut 25. A first end 41 of the spring 40 remote from the belt pulley 27 is at its end fixed by friction force onto the spindle nut 25. A second end 42 of the spring 40 arranged in the direction of the belt pulley 27 is attached to the inside of the housing 22. If now, by means of the drive the spindle nut 25 is rotated in one direction or the other, the co-rotation of the spring 40 produces a torsion torque in the spring 40 since the end 41 of the spring 40 is attached to the spindle nut 25. In the event of a fault, for example tearing of the drive belt 26 or failure of the power supply or of the electric drive mechanism, the torsion torque built up in the spring 40 acts as a restoring torque on the spindle nut 25. Restoration continues until the spindle nut 25 has turned back to the zero position, as shown in FIG. 3. This moves the spindle 24 back, so that the wheel steering angle is adjusted back to zero degrees. It is thereby ensured that even if the drive fails, safer continued driving with a wheel steering angle of zero degrees is made possible.

INDEXES

1 Vehicle
2 Wheel
3 Wheel
4 Steer-by-wire steering device
5 Steer-by-wire steering device
21 Front axle
31 Rear axle
41 Track rod
51 Track rod
$S_G$ Center of gravity of the vehicle
$R_G$ Yaw torque
ESC Electronic stability control
SG Control unit
T Trajectory
$\delta_V$ Front wheel steering angle
$\delta_H$ Rear wheel steering angle
20 Steering gear
22 Housing
22*a* Axial stop
23 Spindle drive
24 Spindle
25 Spindle nut
26 Traction means
27 Belt pulley
28 Roller bearing
29 Cover
40 Energy store
41 First end
42 Second end
a Longitudinal axis
100 Central actuator, steering gear system
101 Belt
102 Spindle nut
103 Spindle
104 Spindle drive
105 Internal thread
106 Belt pulley
107 Oblique ball-bearing
108 Oblique ball-bearing
109 Housing
111 Slide bearing
113 Slide bearing

114 Traction drive
115 Electric motor
116 Drive wheel
117 Pivot bushing
118 Pivot bushing

The invention claimed is:

1. A steering gear system for a steer-by-wire steering device of a motor vehicle, the steering gear system comprising:

a housing, a spindle, a rotatable axially fixed spindle nut being located inside the housing, a spindle drive for axially displacing the spindle relative to the spindle nut, the spindle nut being supported, at least indirectly relative to the housing, by at least an energy store in a rotational direction about a longitudinal axis of the spindle nut such that the spindle nut is at least one of:

maintainable in a zero position or within a range around the zero position, and rotatable back to the zero position.

2. The steering gear system according to claim 1, wherein the energy store is in the form of a spring.

3. The steering gear system according to claim 2, wherein the spring is one of a spiral spring, a torsion spring, a leg spring or a volute spring.

4. The steering gear system according to claim 1, wherein the energy store is arranged coaxially around at least one of the spindle and the spindle nut.

5. The steering gear system according to claim 1, wherein a first end of the energy store is coupled, at least indirectly, to the spindle nut and is attached to a belt pulley, coupled with at least one of interlock, by friction force and in a material merged manner to the spindle nut, and a second end of the energy store is fixed, at least indirectly, to either the housing or the spindle.

6. The steering gear system according to claim 1, wherein a restoring torque is applied by the energy store on the spindle nut and the restoring torque is smaller than a torque of a drive.

7. The steering gear system according to claim 6, wherein the drive is one of an electric motor or an electric motor with a transmission in a form of a belt drive.

8. The steering gear system according to claim 1, wherein the spindle drive is a self-locking spindle drive, and the energy store directly applies a restoring torque on the spindle nut, and the restoring torque is larger than an overall torque that brings about the self-locking.

9. The steering gear system according to claim 1, wherein the energy store is arranged coaxially around and surrounding the spindle and the spindle nut.

10. A steer-by-wire steering device for a rear axle steering system of a motor vehicle, the steering system comprising a steering gear system comprising:

a housing, a spindle, a rotatable axially fixed spindle nut being located inside the housing, a spindle drive for axially displacing the spindle relative to the spindle nut, the spindle nut being supported, at least indirectly relative to the housing, by at least an energy store in a rotational direction about a longitudinal axis of the spindle nut such that the spindle nut is at least one of:

maintainable in a zero position or within a range around the zero position, and rotatable back to the zero position.

11. A steering gear system for a steer-by-wire steering device of a motor vehicle, the steering gear system comprising:

a spindle drive arranged within a housing, the spindle drive having a spindle and a spindle nut, the spindle defining a longitudinal axis, the spindle nut being axially fixed relative to the housing, the spindle nut engaging the spindle and being rotatable about the longitudinal axis such that rotation of the spindle nut axially displaces the spindle relative to the spindle nut;

the spindle nut being directly rotatably supported, relative to the housing, by an energy store such that the spindle nut is at least one of:

either maintainable in a zero position or within a range around the zero position, and rotatable back to the zero position.

* * * * *